3,255,077
METHOD FOR KILLING INSECTS WITH 2-METHYL-1-THIOCYANO-NAPHTHALENE
Clinton C. Shipman, 5301 Verdome, Houston 18, Tex.; Nathan Patrick Kendrick, Cindy Lane, Burleson, Tex.; and Stephen L. Razniak, East Texas State College Station, Commerce, Tex.
No Drawing. Filed Jan. 11, 1963, Ser. No. 250,751
2 Claims. (Cl. 167—32)

This invention relates to a composition of matter, and it concerns more particularly the compound 2-methyl-1-thiocyano-naphthalene and an insecticide containing such compound as its essential, insecticidally active ingredient.

The compound 2-methyl-1-thiocyano-naphthalene may be prepared in the following manner:

A solution of lead nitrate is reacted in the cold with a solution of sodium thiocyanate. The precipitated lead thiocyanate is separated by filtration, washed with ice water followed by ethanol, and then vacuum dried.

The lead thiocyanate is then suspended in anhydrous acetic acid, cooled to 0° C., and treated with a solution of bromine in anhydrous acetic acid. The resulting solution of thiocyanogen is then decanted from the precipitated lead bromide into a light proof reaction vessel. The lead bromide is washed with additional solvent and the wash combined with the original decanted solution. The thiocyanogen solution is cooled and treated with a solution of dried chlorine in anhydrous acetic acid with agitation.

The resulting solution of chlorothiocyanogen is again cooled and a solution of 2-methyl naphthalene in anhydrous acetic acid is added with thorough stirring. After standing, the solution is diluted with its own volume of water and cooled. The crystallized material is separated by filtration, washed with water, and recrystallized from 95% ethanol with decoloration by charcoal to give white needles of 2-methyl-1-thiocyano-naphthalene.

All of the above mentioned chemicals are available commerically.

The compound 2-methyl-1-thiocyano-naphthalene advantageously may be employed in the manufacture of insecticides, as illustrated by the following examples:

*Example I*

An aerosol spray type insecticide composition was prepared containing the following ingredients:

| | Percent by weight |
|---|---|
| 2-methyl-1-thiocyano-naphthalene | 0.5 |
| Espesol 5 | 59.5 |
| Freon | 40.0 |

The insecticide composition above described was tested experimentally in killing flies, roaches, mosquitoes, aphids, red spiders, and crickets, resulting in 100% knocked down and 100% killed, substantially 90% of those killed having been killed instantaneously.

*Example II*

An insecticide composition similar to the composition described in Example I, but containing 1% by weight 2-methyl-1-thiocyano-naphthalene and 59% Espesol 5, balance Freon, was tested experimentally with substantially the same results.

*Example III*

An insecticide composition similar to the compositions described in Examples I and II, but containing 2% by weight 2-methyl-1-thiocyano-naphthalene and 58% Espesol 5, balance Freon, was tested experimentally with similar results.

Thus, as these examples show, insects may be killed by contact with an insecticidally effective amonut of 2-methyl-1-thiocyano-naphthalene.

The invention may be modified in various ways without departing from the spirit and scope thereof.

We claim:
1. A method for killing insects, which method comprises contacting insects with an insecticidally effective amount of 2-methyl-1-thiocyano-naphthalene.
2. A method for killing insects, which method comprises contacting insects with an insecticidally effective amount of an insecticidal composition comprising as an insecticidally active ingredient 2-methyl-1-thiocyano-naphthalene.

References Cited by the Examiner
UNITED STATES PATENTS

| | | | |
|---|---|---|---|
| 2,539,493 | 1/1951 | Stahly | 260—454 |
| 2,572,567 | 10/1951 | Himel et al. | 260—454 |
| 3,027,298 | 3/1962 | Huisman et al. | 167—32 |
| 3,080,278 | 3/1963 | Douros et al. | 167—32 |

FOREIGN PATENTS 520,330   3/1931   Germany.

OTHER REFERENCES

Bacon et al.: J. Chem Soc. (London), vol. of 1961, pp. 2436–2447.

JULIAN S. LEVITT, *Primary Examiner.*

IRVING MARCUS, FRANK CACCIAPAGLIA, JR., *Examiners.*

GEORGE A. MENTIS, FLOYD D. HIGEL,
*Assistant Examiners.*